United States Patent
Kotteri et al.

(10) Patent No.: US 10,846,123 B2
(45) Date of Patent: Nov. 24, 2020

(54) AUDIO RENDERING FROM VIRTUAL MACHINE

(71) Applicant: Microsoft Technology Licensing, LLC, Redmond, WA (US)

(72) Inventors: Kishore Arvind Kotteri, Sammamish, WA (US); Firoz Dalal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/216,837

(22) Filed: Dec. 11, 2018

(65) Prior Publication Data

US 2020/0097312 A1   Mar. 26, 2020

Related U.S. Application Data

(60) Provisional application No. 62/736,226, filed on Sep. 25, 2018.

(51) Int. Cl.
| | | |
|---|---|---|
| *G06F 17/00* | (2019.01) | |
| *G06F 9/455* | (2018.01) | |
| *G06F 3/16* | (2006.01) | |
| *G06F 9/54* | (2006.01) | |

(52) U.S. Cl.
CPC .......... *G06F 9/45558* (2013.01); *G06F 3/165* (2013.01); *G06F 9/544* (2013.01); *G06F 2009/45579* (2013.01); *G06F 2009/45583* (2013.01)

(58) Field of Classification Search
CPC ...... G06F 3/165; G06F 9/45558; G06F 9/544; G06F 2009/45579; G06F 2009/45583
See application file for complete search history.

(56) References Cited

U.S. PATENT DOCUMENTS

| | | | |
|---|---|---|---|
| 8,972,984 B2 | 3/2015 | Meisner et al. | |
| 9,244,705 B1 | 1/2016 | Bondalapati et al. | |
| 2007/0038997 A1* | 2/2007 | Grobman | G06F 21/10 |
| | | | 718/1 |
| 2009/0171677 A1* | 7/2009 | Singhal | G06F 3/162 |
| | | | 704/503 |
| 2012/0297383 A1* | 11/2012 | Meisner | G06F 3/165 |
| | | | 718/1 |
| 2013/0160005 A1* | 6/2013 | Jung | G06F 9/45558 |
| | | | 718/1 |
| 2017/0357516 A1* | 12/2017 | Tan | G06F 9/4411 |
| 2019/0220328 A1* | 7/2019 | Rosenboom | G06F 8/38 |

OTHER PUBLICATIONS

"International Search Report and Written Opinion Issued in PCT Application No. PCT/US2019/039119", dated Nov. 11, 2019, 11 Pages.

* cited by examiner

*Primary Examiner* — Joseph Saunders, Jr.

(74) *Attorney, Agent, or Firm* — Alleman Hall Creasman & Tuttle LLP

(57) ABSTRACT

An audio playback method for a virtual machine of a computing system includes instantiating, via a host operating system of the computing system, a virtual machine A shared memory space is allocated for shared access by both the virtual machine and the host operating system. An audio data stream from the virtual machine is received at the shared memory space. The audio data stream is rendered from the shared memory space based on a global audio policy of the host operating system.

19 Claims, 8 Drawing Sheets

AUDIO RENDERING FROM VIRTUAL MACHINE

CROSS REFERENCE TO RELATED APPLICATIONS

This application claims priority to U.S. Provisional Patent Application Ser. No. 62/736,226, filed Sep. 25, 2018, the entirety of which is hereby incorporated herein by reference for all purposes.

BACKGROUND

A guest application may be hosted in a virtual machine (or other container) that is managed by a host operating system of a computing system for various reasons. In some examples, the guest application may be hosted in the virtual machine to provide additional layer(s) of security between the guest application and other applications in the host operating system. In some examples, the guest application may be configured for a different type of computing platform and/or operating system, and the virtual machine may enable the guest application to be executed within the host operating system on the computing system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An audio playback method for a virtual machine of a computing system includes instantiating, via a host operating system of the computing system, a virtual machine. A shared memory space is allocated for shared access by both the virtual machine and the host operating system. An audio data stream from the virtual machine is received at the shared memory space. The audio data stream is rendered from the shared memory space based on a global audio policy of the host operating system.

DETAILED DESCRIPTION

Figure 1:
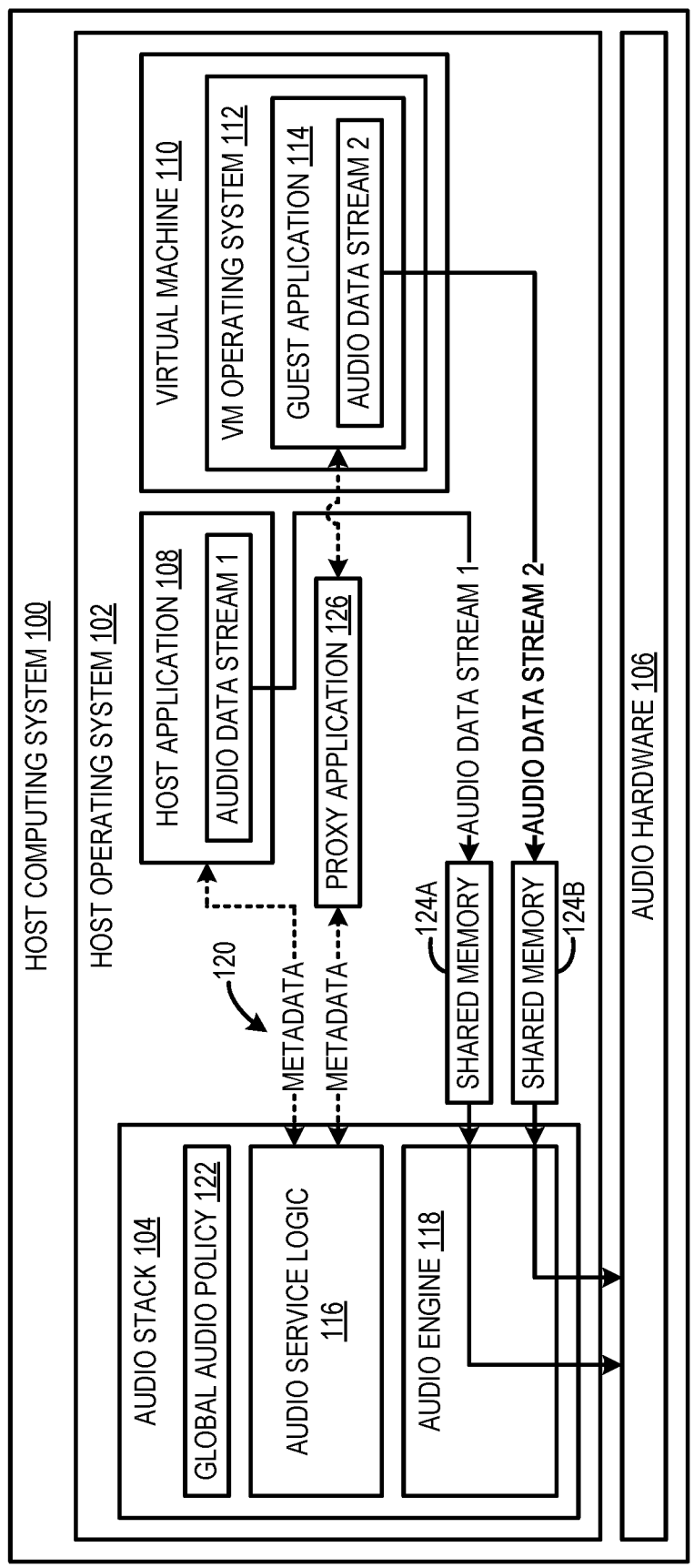
FIG. 1 schematically shows an example computing system in which an audio data stream from a virtual machine is rendered by a host operating system.

A guest application may be hosted in a virtual machine (or other container) that is managed by a host operating system of a computing system. In some examples, a virtual machine may include a virtual machine audio stack that is configured to manage streaming of audio data for guest applications hosted within the virtual machine. In such examples, the host operating system of the computing system is represented to the virtual machine audio stack as a single virtual endpoint. The virtual machine audio stack is configured to package audio data streams provided from all of the guest applications of the virtual machine into audio data stream packets. Further, the virtual machine audio stack is configured to send the audio data stream packets to the single virtual endpoint. An application hosted by the host operating system outside of the virtual machine is configured to receive the audio data stream packets, extract a single audio data stream from the audio data stream packets, and send the audio data stream to an audio stack of the host operating system to render the audio data stream for playback on audio hardware of the computing system.

In such examples, the guest applications may have little or no knowledge of audio functionality of the host operating system and/or computing system, and thus may be unable to leverage such audio functionality for rendering of an audio data stream provided by the guest application. Likewise, the host operating system may have little or no knowledge of original audio data streams of the virtual machine before they are collapsed into a single composite audio stream. Moreover, the host operating system may be unable to parse/separate different audio data streams provided by different guest applications of the virtual machine when unpackaging the audio data stream packets.

Furthermore, due to the packaging of audio data streams provided by the guest application and the subsequent extraction of the audio data stream from the audio data stream packets, a rendering latency of audio data streams provided from virtual machines may be increased relative to audio data streams provided from applications running outside of a virtual machine.

Accordingly, the present description is directed to an approach for rendering audio data streams from virtual machines in a seamless manner such that audio data streams provided from guest applications running in virtual machines have the same behavior as audio data streams provided from host applications running outside of virtual machines. In such an approach, an audio stack of the host operating system is exposed to the guest applications in the virtual machines such that guest applications/virtual machines may provide audio data streams directly to the audio stack of the host operating system without having to be packaged/unpackaged. Additionally, the audio stack of the host operating system may be exposed to metadata that identifies parameters of individual audio data streams provided from virtual machines. As a result, a global audio policy can be applied by the audio stack of the host operating system to all audio data streams regardless of whether the audio data streams are received from guest applications running in virtual machines or from host applications running outside of virtual machines.

FIG. 1 shows an example host computing system 100 including a host operating system 102. The host operating system 102 includes an audio stack 104 configured to handle rendering of audio data streams for playback at audio hardware 106 of the computing system 100. Different applications hosted by the host operating system 102 may produce audio data streams that are processed by the audio stack 104. In the illustrated example, a host application 108 is running in the host operating system 102 outside of any virtual machine or other container. The host application 108 generates a first audio data stream. Further, a virtual machine 110 is instantiated by the host operating system 102. The virtual machine 110 includes a virtual machine operating system 112 and a guest application 114 running in the virtual machine 110. The guest application 114 produces a second audio data stream. In some examples, the virtual machine operating system may be configured for a different computing platform than a computing platform of the host operating system. In other examples, the virtual machine operating system is the same as the host operating system.

The audio stack 104 includes audio service logic 116 and an audio engine 118. The audio service logic 116 is configured to handle audio data stream process/thread creation based on audio data stream events/requests. The audio service logic 116 may create a separate audio data stream process/thread for each audio data stream creation event/request. The audio data stream process/thread may act as a mechanism for the host operating system 102 to process the audio data stream and manage related messaging between different logical components (e.g., audio stack, application).

The audio service logic 116 is configured to, for each audio data stream event/request, receive metadata 120 associated with that audio data stream. The host application 108 may send the metadata associated with the first audio data stream directly to the audio service logic 116 in the audio stack 104. In the case of the guest application 114, the host operating system 102 may be configured to instantiate a proxy application 126 outside of the virtual machine 110 for the guest application 114. The proxy application 126 is configured to relay information between the audio stack 104 and the guest application 114 in the virtual machine 110. In one example, the guest application 114 is configured to send the audio data stream creation event to the proxy application 126 and the proxy application is configured to relay the creation event to the audio stack 104. Further, the guest application 114 is configured to send the metadata 120 to the proxy application 126 and the proxy application 126 is configured to relay the metadata 120 to the audio service logic 116 in the audio stack 104.

The proxy application 126 may be configured to relay any suitable metadata, messages, and/or other information associated with an audio data stream between the audio stack 104 and the guest application 114 running in the virtual machine 110. Note that the host operating system 102 may instantiate a separate proxy application for each guest application in a virtual machine to relay information between that guest application and the host operating system and/or audio stack.

The metadata 120 may indicate any suitable parameter values for the audio data stream. For example, the metadata 120 may indicate a guest application (and indicate if the guest application is within a virtual machine), an audio channel count, an encoding bitrate, an encoding format, duration, sampling rate, sampling size, volume, mixing levels, digital right management (DRM) properties, copyright information, language, media identifier, author, creation date, publisher, song information (e.g., artist, group, album title, genre, mood, lyrics, tracks, parental rating), rating, thumbnail image, and/or any other suitable information.

The audio service logic 116 is configured to apply a same global audio policy 122 to each audio data stream. The audio service logic 116 may be configured to apply the global audio policy 122 to each audio data stream based at least in part on the metadata 120 associated with that audio data stream. The global audio policy 122 may determine how each audio data stream is rendered by the audio engine 118.

The global audio policy 122 may include any suitable rules, logic, and/or other functionality for rendering audio data streams. For example, the global audio policy 122 may include privacy settings, audio settings including application-specific default audio device settings, audio playback priorities, audio ducking/mixing settings, user preferences, operating system audio settings, processing technologies and/or audio hardware features provided by the audio hardware 106 (e.g., spatial or mono-mix), and system-wide audio features that can be retro-fitted to existing legacy applications. In examples where the audio hardware includes a plurality of audio output devices and/or interfaces (e.g., speakers, headphones, Bluetooth, HDMI), the global audio policy 122 may specify which audio data streams are rendered for playback at which audio devices. In some examples, the global audio policy 122 may specify that audio data streams from guest applications running in virtual machines and audio data streams from host applications running outside of virtual machines may be mixed together and rendered for playback at the same audio device. In some examples, the global audio policy may be applied to an audio data stream based on the parameters of the audio data stream as indicated by the metadata for the audio data stream.

By applying the global audio policy 122 to all audio data streams from application running inside and outside of virtual machines, the same audio preferences from the host operating system can be applied to the audio data streams from the host and audio data streams from virtual machines to provide a seamless audio experience. In this way, an application may have the same audio behavior regardless of whether the application is running in a virtual machine or outside of a virtual machine on the host computing system 100.

The audio stack 104 may be configured to allocate a different shared memory space 124 (e.g., 124A, 124B) for each audio data stream. The shared memory space 124 may have shared access by both the application that produces the audio data stream and the audio stack 104 and/or the host operating system 102. In the case of the host application 108 running in the host operating system 102, the host application 108 sends the first audio data stream directly to the shared memory space 124A. In the case of the guest application 114 running in the virtual machine 110, the guest application 114 sends the second audio data stream directly from the virtual machine 110 to the shared memory space 124B.

In some examples, the shared memory space may be allocated for an audio data stream in response to an audio data stream creation event generated by an application that produces the audio data stream. In some examples, the application may initiate allocation of the shared memory space based on the audio data stream creation event. For example, the application may allocate the shared memory space, via the host operating system, and then send a message indicating the location of shared memory space to the audio stack. In other examples, the audio stack may initiate allocation of the shared memory space based on an audio data stream creation event. For example, the audio stack may allocate the shared memory space and then send a message indicating the location of shared memory to the application that produced the audio data stream.

The audio engine 118 may be configured to, for each audio data stream, render, from the shared memory space 124, the audio data stream based on the global audio policy 122 of the host operating system 102. In this way, all of the audio data streams may be rendered based on the same global audio policy of the host operating system 102. The audio engine 118 may render the audio data streams in any suitable manner based on the global audio policy 122.

Since the audio stack 104 is exposed to the guest application 114 in the virtual machine 110, in some implementations, the audio stack 104 may be configured to send, to the guest application 114 in the virtual machine 110, an audio hardware clock signal that dictates when rendered audio data is output to an audio device. Further, the guest application 114 in the virtual machine 110 may be configured to send the audio data stream to the shared memory space 124 in synchronicity with the audio hardware clock signal. In this way, the audio data stream produced by the guest application may be properly synchronized with the audio hardware 106. In some examples, the audio hardware clock signal may be different from a clock signal of the virtual machine. In some such examples, the audio hardware clock signal may override the clock signal of the virtual machine such that the audio hardware clock signal may be used to send the audio data stream instead of the clock signal of the virtual machine.

In some examples, the guest and host applications may send the audio data streams to the shared memory spaces and the audio engine may retrieve the audio data streams from the shared memory spaces and render the audio data streams in substantially real time.

It will be appreciated that, in some implementations, the virtual machine 110 may be instantiated without a separate virtual machine audio stack for handling playback of audio data streams of guest applications within the virtual machine 110. Instead, guest applications running in the virtual machine 110 can send unpackaged audio data streams directly to the shared memory space 124 for rendering. Such a configuration reduces rendering latency of audio data streams produced by guest applications in virtual machines. Moreover, such a configuration allows for an audio data stream from a virtual machine and a different audio data stream from a host application outside of the virtual machine to have a same rendering latency and/or a same number of hops to be rendered. Such audio processing may be carried out without compromising a security boundary of the virtual machine.

In some implementations, the audio stack may be hosted in one or more virtual machines and/or audio data stream processing may be performed by an operating system of a virtual machine. For example, a host computing system may have a plurality of virtual machines, and one or more of the virtual machines may be designated as an "audio host" that has an audio stack for processing audio data streams and the audio data streams from the other virtual machines and/or the host operating system may be routed to the virtual machine designated as the audio host for processing.

Host operating system 102, audio stack 104, audio service logic 116, audio engine 118, host application 108, virtual machine 110, virtual machine operating system 112, guest application 114, and proxy application 126 may be implemented as one or more applications, objects, modules, and/or other software or instantiated logic, and may operate to provide services in conjunction with host computing system 100.

Figure 2:
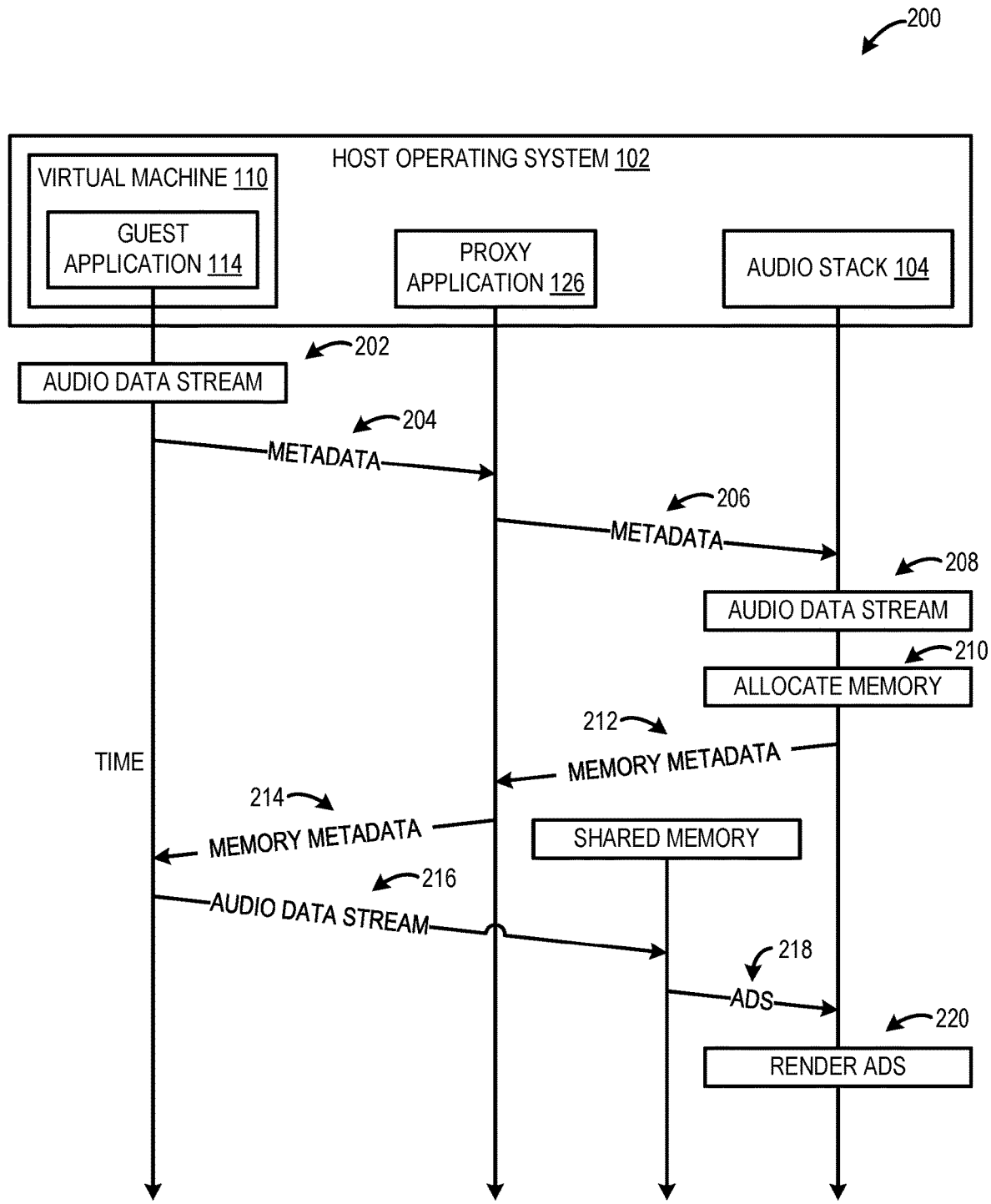
FIG. 2 is a communication diagram showing example messaging and data sharing between logical components to render an audio data stream from a virtual machine.

FIG. 2 is a communication diagram 200 showing example messaging and data sharing between logical components of the host computing system 100 of FIG. 1 in order to render an audio data stream from a virtual machine. At 202, the guest application 114 running in the virtual machine 110 creates an audio data stream in the virtual machine 110. The virtual machine 110 creates an audio data stream creation event/request based on the audio data stream. At 204, the virtual machine 110 creates a cross virtual machine plugin object that establishes cross virtual machine communication with the proxy application 126 running in the host operating system 102, and the plugin forwards metadata including audio data stream parameters to the proxy application 126. The proxy application 126 creates an instance of the audio data stream creation event/request for the host operating system 102 based on receiving the metadata. At 206, the proxy application 126 forwards the metadata to the audio stack 104. The metadata includes audio data stream parameters including an indication that the audio data stream is a cross virtual machine audio data stream produced by a guest application running in a virtual machine. At 208, the audio stack 104 creates a process/thread for handling the audio data stream. At 210, the audio stack 104 allocates a shared memory space corresponding to the audio data stream process. At 212, the audio stack 104 forwards metadata that enables the guest application 114 to connect to the shared memory space to the proxy application 126. For example, the metadata may be encoded into a serialized memory descriptor blob. At 214, the proxy application 126 sends the metadata (e.g., the serialized memory descriptor blob) over the plugin to the guest application 114 in the virtual machine 110. At 216, the guest application 114 sends the audio data stream directly to the shared memory space using the serialized memory descriptor blob to connect to the shared memory space. At 218, the audio stack 104 receives the audio data stream from the shared memory space. At 220, the audio stack 104 renders the audio data stream based on the global audio policy.

The communication diagram 200 is provided as an example. Any suitable variation in communication between the different logical components of the host computing system may be contemplated. In one example, the guest application may initiate allocation of the shared memory space instead of the audio stack, and the guest application may send the serialized memory descriptor blob to the audio stack so that the audio stack can connect to the shared memory space.

Figure 3:
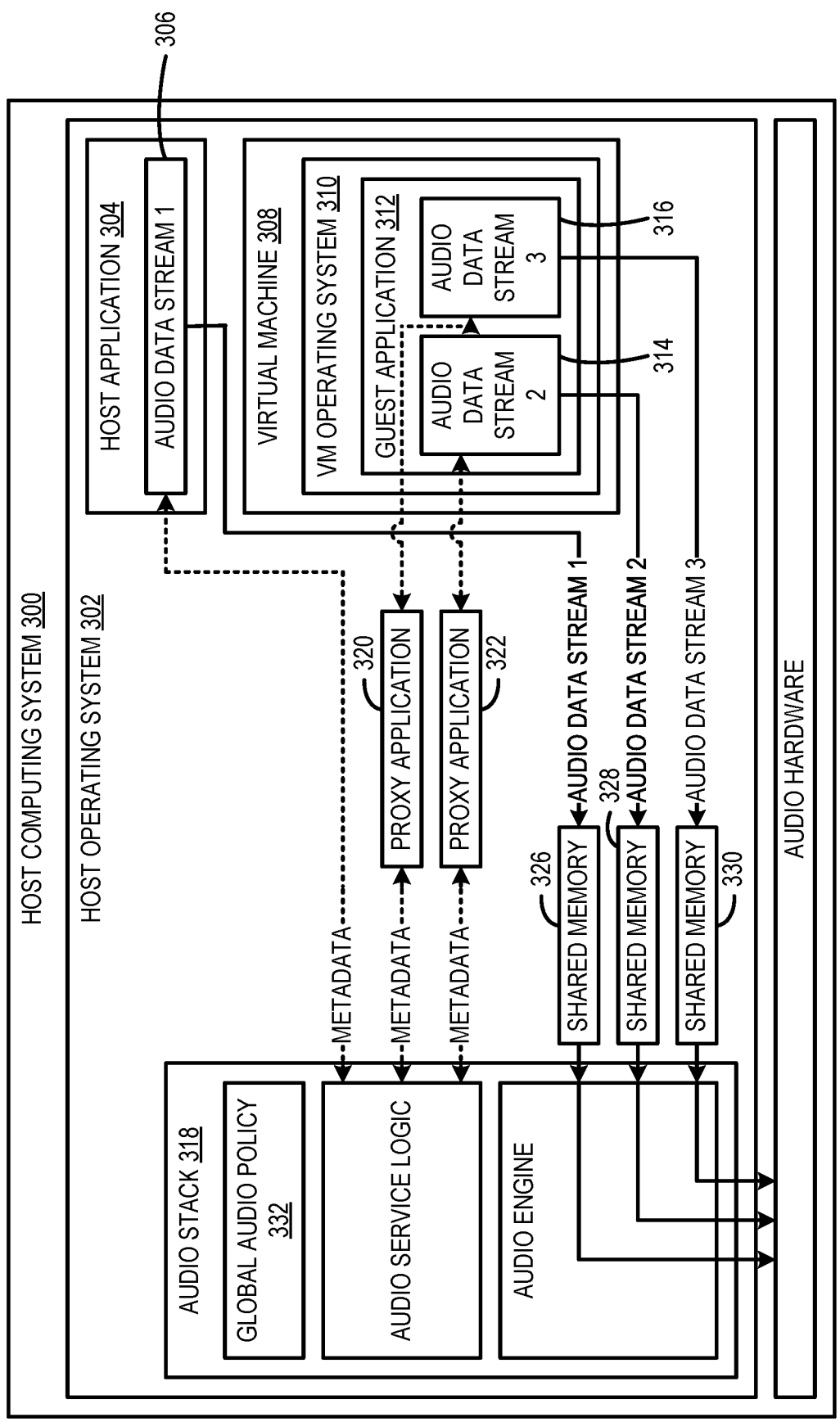
FIG. 3 shows an example scenario in which multiple audio data streams from a guest application of a virtual machine are rendered by a host operating system.
Figure 4:
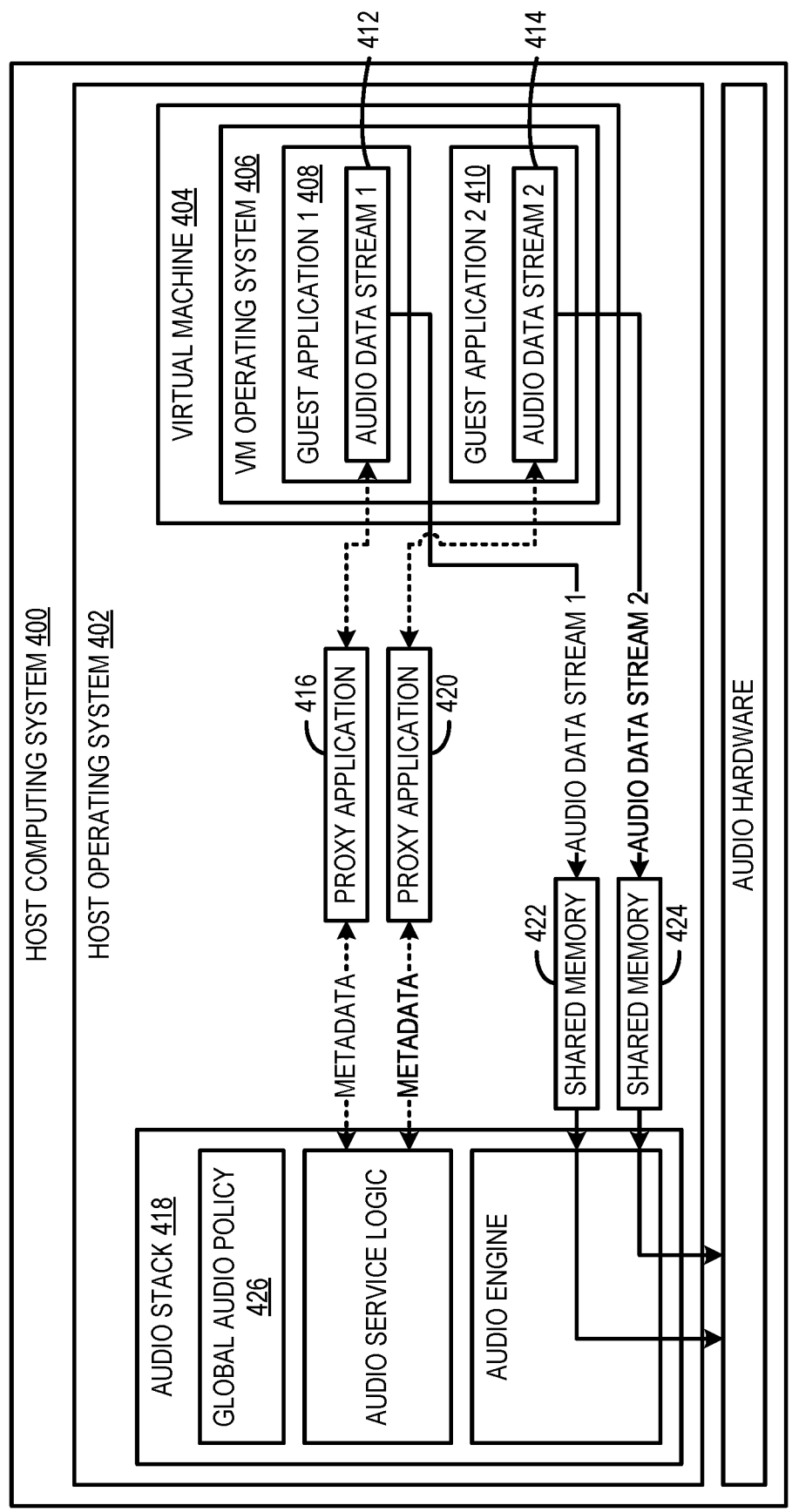
FIG. 4 shows an example scenario in which different audio data streams from different guest applications of the same virtual machine are rendered by a host operating system.
Figure 5:
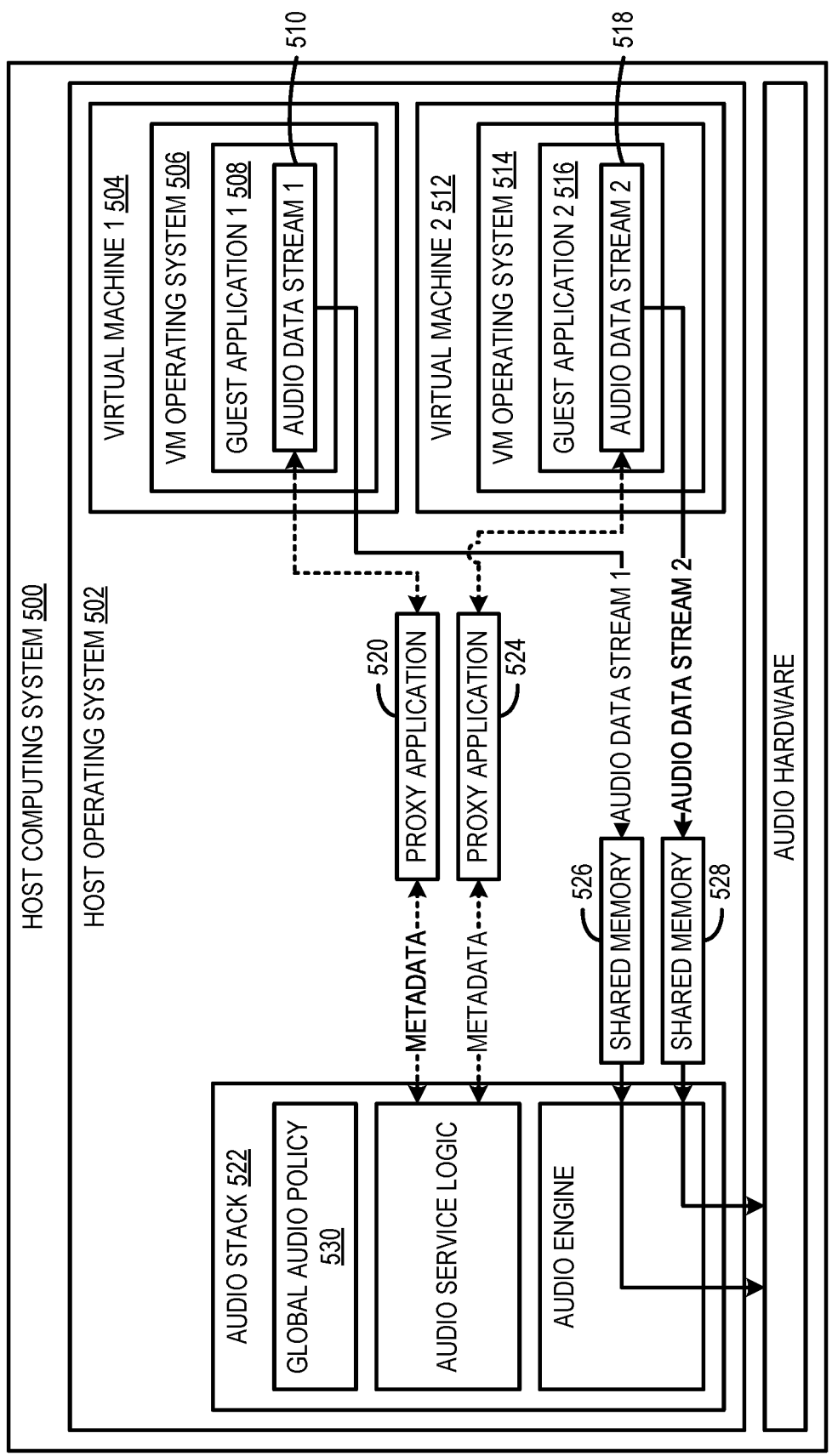
FIG. 5 shows an example scenario in which different audio data streams from different guest application of different virtual machines are rendered by a host operating system.

FIGS. 3-5 depict different scenarios in which audio data streams from virtual machines are rendered by an audio stack of a host operating system of a host computing system. In FIG. 3, a host computing system 300 includes a host operating system 302. The host operating system 302 executes a host application 304 that produces a first audio data stream 306. The host operating system 302 instantiates a virtual machine 308 including a virtual machine operating system 310 that manages a guest application 312. The guest application 312 running in the virtual machine 308 produces a second audio data stream 314 and a third audio data stream 316. The host application 304 sends metadata associated with the first audio data stream 306 directly to an audio stack 318 of the host operating system 302. The guest application 312 sends metadata associated with the second audio data stream 314 to a first proxy application 320 and the first proxy application 320 relays the metadata to the audio stack 318. The guest application 312 sends metadata associated with the third audio data stream 316 to a second proxy application 322 and the second proxy application 322 relays the metadata to the audio stack 318. The audio stack 318 allocates three separate shared memory spaces 326, 328, 330, each corresponding to a different one of the three audio data streams (e.g., shared memory space 326 corresponding to the first audio data stream 306, shared memory space 328 corresponding to the second audio data stream 314, and shared memory space 330 corresponding to the third audio data stream 316). The host application 304 sends the first audio data stream 306 to the first shared memory space 326. The guest application 312 sends the second audio data stream 314 to the second shared memory space 328 and sends the third audio data stream 316 to the third shared memory space 330. The audio stack 318 retrieves the three audio data streams 306, 314, 316 from the three shared memory spaces 326, 328, 330 and renders the three data streams 306, 314, 316 based on the same global audio policy 332. In this scenario, the audio data streams from applications running inside and outside of the virtual machine are handled in the same manner and have the same rendering latency.

In FIG. 4, a host computing system 400 includes a host operating system 402. The host operating system 402 instantiates a virtual machine 404 including a virtual machine operating system 406 that manages a first guest application 408 and a second guest application 410. The first guest application 408 running in the virtual machine 404 produces a first audio data stream 412 and the second guest application 410 running in the same virtual machine 404 produces a second audio data stream 414. The first guest application 408 sends metadata associated with the first audio data stream 412 to a first proxy application 416. The first proxy application relays 416 the metadata to an audio stack 418 of the host operating system 402. The second guest application 410 sends metadata associated with the second audio data stream 414 to a second proxy application 420. The second proxy application 420 relays the metadata to the audio stack 418. The audio stack 418 allocates two separate shared memory spaces 422, 424, each corresponding to a different one of the two audio data streams (e.g., shared memory space 422 corresponding to the first audio data stream 412, and shared memory space 424 corresponding to the second audio data stream 414). The first guest application 408 sends the first audio data stream 412 to the first shared memory space 422. The second guest application 410 sends the second audio data stream 414 to the second shared memory space 424. The audio stack 418 retrieves the two audio data streams 412, 414 from the two shared memory spaces 422, 424 and renders the two data streams 412, 414 based on the same global audio policy 426. In this scenario, the audio data streams from different applications running inside the same virtual machine are handled in the same manner and have the same rendering latency. Note that the two guest applications may be two instances of the same type of application or two different types of applications.

In FIG. 5, a host computing system 500 includes a host operating system 502. The host operating system 502 instantiates a first virtual machine 504 including a virtual machine operating system 506 that manages a first guest application 508. The first guest application 508 running in the first virtual machine 504 produces a first audio data stream 510. Further, the host operating system 502 instantiates a second virtual machine 512 including a virtual machine operating system 514 that manages a second guest application 516. The second guest application 516 running in the second virtual machine 512 produces a second audio data stream 518. The first guest application 508 sends metadata associated with the first audio data stream 510 to a first proxy application 520. The first proxy application 520 relays the metadata to an audio stack 522 of the host operating system 502. The second guest application 516 sends metadata associated with the second audio data stream 518 to a second proxy application 524. The second proxy application 524 relays the metadata to the audio stack 522. The audio stack 522 allocates two separate shared memory spaces 526, 528, each corresponding to a different one of the two audio data streams 510, 518 (e.g., shared memory space 526 corresponding to the first audio data stream 510, shared memory space 528 corresponding to the second audio data stream 518. The first guest application 508 sends the first audio data stream 510 to the first shared memory space 526. The second guest application 516 sends the second audio data stream 518 to the second shared memory space 528. The audio stack 522 retrieves the two audio data streams 510, 518 from the two shared memory spaces 526, 528 and renders the two data streams 510, 518 based on the same global audio policy 530. In this scenario, the audio data streams from different applications running inside two different virtual machines are handled in the same manner and have the same rendering latency. Note that the two guest applications may be two instances of the same type of application or two different types of applications.

It will be appreciated that any suitable audio data stream from a guest application in a virtual machine may be handled by the audio stack of the host operating system. For example, a host operating system may host two or more virtual machines each including two or more guest applications. Each of the two or more guest applications may produce two or more audio data streams, and all of the audio data streams may be handled by the audio stack of the host operating system. In another example, a first virtual machine may be hosted by a second virtual machine such that the first virtual machine is nested in the second virtual machine. Each of the first and second virtual machines may host a guest application that produces an audio data stream, and both of the audio data streams may be handled by the audio stack of the host operating system and the audio data streams may be rendered according to the same global audio policy.

Figure 6:
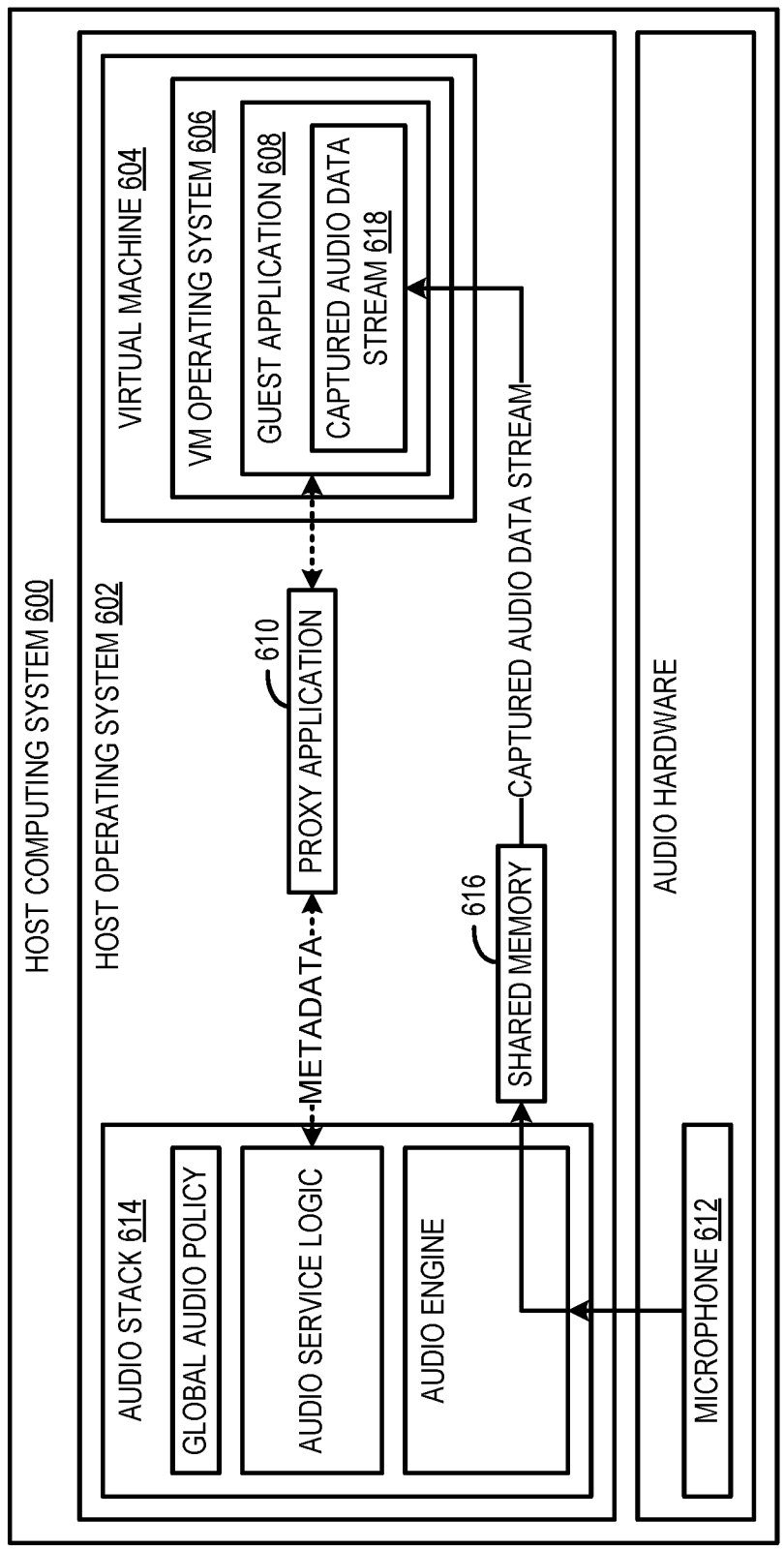
FIG. 6 shows an example scenario in which a captured audio data stream captured from an audio recording device is sent to a virtual machine.

FIG. 6 shows an example scenario in which an audio data stream is captured by an audio recording device is sent to a virtual machine. A host computing system 600 includes a host operating system 602. The host operating system 602 instantiates a virtual machine 604 including a virtual machine operating system 606 that manages a guest application 608. The guest application 608 running in the virtual machine 604 sends, to a proxy application 610, a request for an audio data stream to be recorded by a microphone 612 of the host computing system 600. The proxy application 610 relays the request to an audio stack 614 of the host operating system 602. The audio stack 614 allocates a shared memory space 616 for shared access by both the audio stack 614 and the guest application 608 based on receiving the request. The audio stack 614 receives a captured audio data stream 618 from the microphone 616 and sends the captured data stream 618 to the shared memory space 616. The guest application 608 connects to the shared memory space 616 and retrieves the captured audio data stream 618 from the shared memory space. In other words, the captured audio data stream 618 is sent directly from the shared memory space 616 to the virtual machine 604. Note that a host application running outside of a virtual machine may receive a captured audio data stream record by an audio recording device in the same manner by retrieving the captured audio data stream from a shared memory space allocated for the captured audio data stream.

Figure 7:
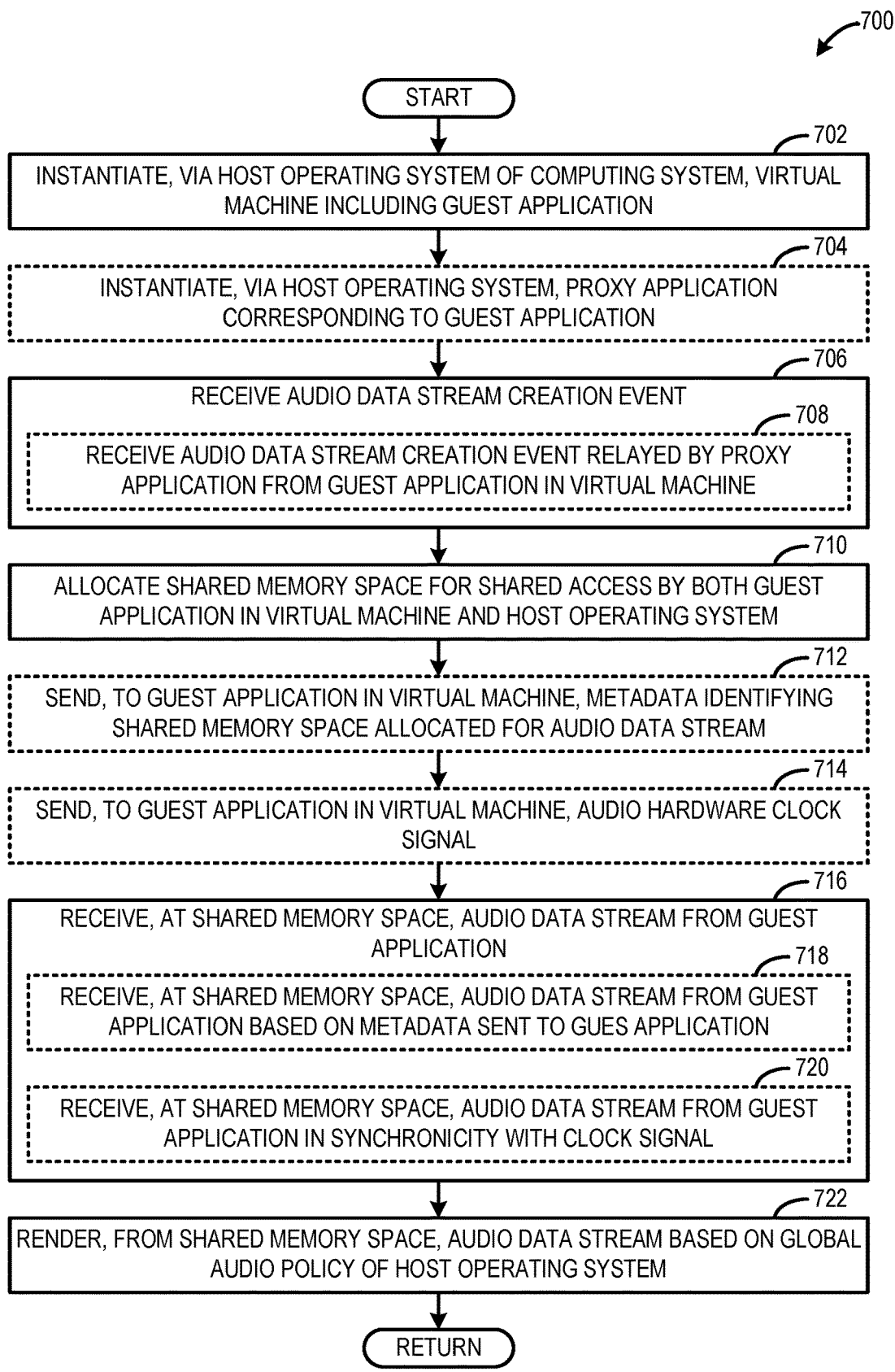
FIG. 7 is a flowchart of an example audio playback method for a virtual machine of a computing system.

FIG. 7 is a flowchart of an example audio playback method 700 for a virtual machine of a computing system. For example, the method may be performed by the host operating system 102 and/or the audio stack 104 of the host computing system 100 of FIG. 1. At 702, the method 700 includes instantiating, via a host operating system of a computing system, a virtual machine (or other container) including a guest application. At 704, the method 700 optionally may include instantiating, via the host operating system, a proxy application corresponding to the guest application. At 706, the method 700 includes receiving an audio data stream creation event. In some implementations, at 708, the method 700 optionally may include receiving the audio data stream creation event relayed by the proxy application from the guest application in the virtual machine. At 710, the method 700 includes allocating a shared memory space for shared access by both the guest application in the virtual machine and the host operating system. In some implementations, the shared memory space may be allocated based on the audio data stream creation event. In some implementations, allocation of the shared memory space may be initiated by the guest application/virtual machine. In some implementations, allocation of the shared memory space may be initiated by the audio stack of the host operating system. In some such implementations, at 712, the method 700 optionally may include sending, to the guest application, metadata identifying the shared memory space allocated for the audio data stream. The metadata may enable the guest application to identify the correct memory space to send an audio data stream. At 714, the method 700 optionally may include sending, to the guest application in the virtual machine, an audio hardware clock signal. At 716, the method 700 includes receiving, at the shared memory space, an audio data stream from the guest application. In some implementations, at 718, the method 700 optionally may include receiving the audio data stream from the guest application based on the metadata being sent to the guest application. In other words, the guest application may use the received metadata to connect to the shared memory space. In some implementations, at 720, the method 700 optionally may include sending the audio data stream to the shared memory space in synchronicity with the audio hardware clock signal. At 722, the method 700 includes rendering, from the shared memory space, the audio data stream based on a global audio policy of the host operating system.

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
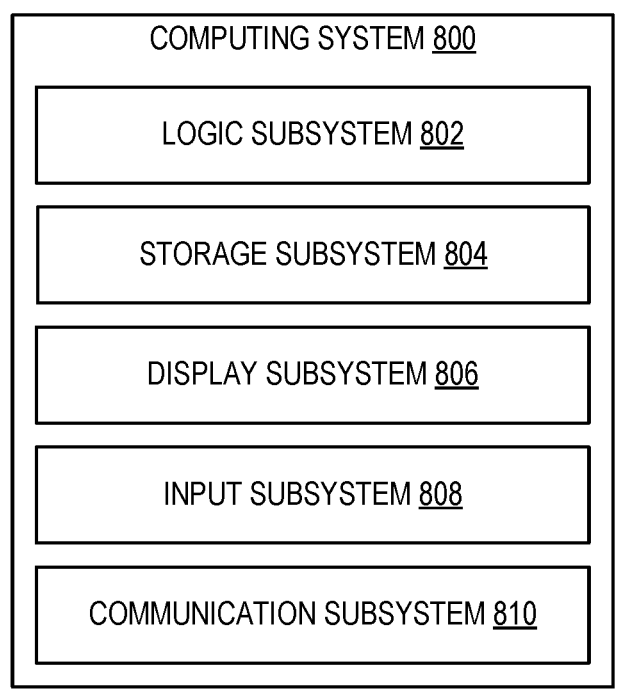
FIG. 8 shows an example computing system.

FIG. 8 schematically shows a non-limiting implementation of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices. For example, the computing system 800 may take the form of host computing system 100 shown in FIG. 1, host computing system 300 shown in FIG. 3, host computing system 400 shown in FIG. 4, host computing system 500 shown in FIG. 5, and/or host computing system 600 shown in FIG. 6.

Computing system 800 includes a logic machine 802 and a storage machine 804. Computing system 800 may optionally include a display subsystem 806 input subsystem 808, communication subsystem 810, and/or other components not shown in FIG. 8.

Logic machine 802 includes one or more physical devices configured to execute instructions. For example, the logic machine 802 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 802 may include one or more processors configured to execute software instructions. Additionally or alternatively, the logic machine 802 may include one or more hardware or firmware logic machines configured to execute hardware or firmware instructions. Processors of the logic machine 802 may be single-core or multi-core, and the instructions executed thereon may be configured for sequential, parallel, and/or distributed processing. Individual components of the logic machine 802 optionally may be distributed among two or more separate devices, which may be remotely located and/or configured for coordinated processing. Aspects of the logic machine 802 may be virtualized and executed by remotely accessible, networked computing devices configured in a cloud-computing configuration.

Storage machine 804 includes one or more physical devices configured to hold instructions executable by the logic machine 802 to implement the methods and processes described herein. When such methods and processes are implemented, the state of storage machine 804 may be transformed—e.g., to hold different data.

Storage machine 802 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some implementations, the input subsystem 808 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem 810 may be configured for communication via a wireless telephone network, or a wired or wireless local- or wide-area network. In some implementations, the communication subsystem 810 may allow computing system 800 to send and/or receive messages to and/or from other devices via a network such as the Internet.

In an example, an audio playback method for a virtual machine of a computing system comprises instantiating, via a host operating system of the computing system, a virtual machine, allocating a shared memory space for shared access by both the virtual machine and the host operating system, receiving, at the shared memory space, an audio data stream from the virtual machine, and rendering, from the shared memory space, the audio data stream based on a global audio policy of the host operating system. In this example and/or other examples, the virtual machine may be one of a plurality of virtual machines, a different shared memory space may be separately allocated for each virtual machine; and audio data streams from all of the different shared memory spaces corresponding to the plurality of virtual machines may be rendered based on the same global audio policy of the host operating system. In this example and/or other examples, the virtual machine may include a guest operating system and a guest application, and the guest application may provide the audio data stream to the shared memory space. In this example and/or other examples, the guest application may be one of a plurality of guest applications, a different shared memory space may be separately allocated for each guest application; and audio data streams from all of the different shared memory spaces corresponding to the plurality of guest applications may be rendered based on the same global audio policy of the host operating system. In this example and/or other examples, one or more host applications may be instantiated, via the host operating system, outside of the virtual machine, a different shared memory space may be separately allocated for each host application; and audio data streams from all of the different shared memory spaces corresponding to the one or more host applications may be rendered based on the same global audio policy of the host operating system. In this example and/or other examples, the shared memory space may be allocated in response to an audio data stream creation event generated by the guest application. In this example and/or other examples, the method may further comprise instantiating, via the host operating system, a proxy application corresponding to the guest application, the proxy application may be configured to receive the audio data stream creation event and relay the audio data stream creation event to the host operating system. In this example and/or other examples, the audio data stream creation event may include metadata that identifies parameters of the audio data stream, and rendering the audio data stream based on the global audio policy may include applying the global audio policy to the parameters of the audio data stream. In this example and/or other examples, the method may further comprise sending, to the guest application, metadata identifying the shared memory space allocated for the audio data stream. In this example and/or other examples, the method may further comprise sending, to the virtual machine, an audio hardware clock signal, and the virtual machine may be configured to send the audio data stream to the shared memory space in synchronicity with the audio hardware clock signal. In this example and/or other examples, allocating, receiving, and rendering may be performed by an audio stack of the host operating system. In this example and/or other examples, the global audio policy may include one or more of audio settings, user preferences, audio processing technologies, and/or audio hardware features that are applied to the audio data stream. In this example and/or other examples, the virtual machine may include a virtual machine operating system for a different computing platform than a computing platform of the host operating system. In this example and/or other examples, the audio data stream from the virtual machine and a different audio data stream from a host application outside of the virtual machine may have a same rendering latency and/or a same number of hops to be rendered. In this example and/or other examples, the method may further comprise allocating a different shared memory space for shared access by both the virtual machine and the host operating system, receiving, at the different shared memory space, a captured audio data stream captured from an audio recording system based on the global audio policy, and providing the captured audio data stream, from the shared memory space, to the virtual machine.

In an example, a computing system comprises one or more logic machines, and one or more storage machines holding instructions executable by the one or more logic machines to instantiate, via a host operating system of the computing system, a virtual machine, allocate a shared memory space of the one or more storage machines for shared access by both the virtual machine and the host operating system, receive, at the shared memory space, an audio data stream from the virtual machine, and render, from the shared memory space, the audio data stream based on a global audio policy of the host operating system. In this example and/or other examples, the virtual machine may be one of a plurality of virtual machines, a different shared memory space may be separately allocated for each virtual machine, and audio data streams from all of the different shared memory spaces corresponding to the plurality of virtual machines may be rendered based on the same global audio policy of the host operating system. In this example and/or other examples, the virtual machine may include a guest operating system and a guest application, and the guest application may provide the audio data stream to the shared memory space. In this example and/or other examples, the guest application may be one of a plurality of guest applications, a different shared memory space may be separately allocated for each guest application; and audio data streams from all of the different shared memory spaces corresponding to the plurality of guest applications may be rendered based on the same global audio policy of the host operating system.

In an example, a computing system comprises one or more logic machines, and one or more storage machines holding instructions executable by the one or more logic machines to instantiate, via a host operating system of the computing system, a virtual machine including a guest application, instantiate, via the host operating system, a proxy application corresponding to the guest application, receive an audio data stream creation event relayed by the proxy application from the guest application in the virtual machine, allocate a shared memory space for shared access by both the guest application and the host operating system, receive, at the shared memory space, an audio data stream from the guest application, and render, from the shared memory space, the audio data stream based on a global audio policy of the host operating system.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An audio playback method for a virtual machine of a computing system, the method comprising:
   instantiating, via a host operating system of the computing system, a virtual machine;
   allocating a shared memory space for shared access by both the virtual machine and the host operating system;
   sending, to the virtual machine, an audio hardware clock signal;
   receiving, at the shared memory space, an audio data stream from the virtual machine, wherein the virtual machine is configured to send the audio data stream to the shared memory space in synchronicity with the audio hardware clock signal; and
   rendering, from the shared memory space, the audio data stream based on a global audio policy of the host operating system.

2. The method of claim 1, wherein the virtual machine is one of a plurality of virtual machines, wherein a different shared memory space is separately allocated for each virtual machine; and wherein audio data streams from all of the different shared memory spaces corresponding to the plurality of virtual machines are rendered based on the same global audio policy of the host operating system.

3. The method of claim 1, wherein the virtual machine includes a guest operating system and a guest application, and wherein the guest application provides the audio data stream to the shared memory space.

4. The method of claim 3, wherein the guest application is one of a plurality of guest applications, wherein a different shared memory space is separately allocated for each guest application; and wherein audio data streams from all of the different shared memory spaces corresponding to the plurality of guest applications are rendered based on the same global audio policy of the host operating system.

5. The method of claim 3, wherein one or more host applications is instantiated, via the host operating system, outside of the virtual machine, wherein a different shared memory space is separately allocated for each host application; and wherein audio data streams from all of the different shared memory spaces corresponding to the one or more host applications are rendered based on the same global audio policy of the host operating system.

6. The method of claim 3, wherein the shared memory space is allocated in response to an audio data stream creation event generated by the guest application.

7. The method of claim 6, further comprising:
   instantiating, via the host operating system, a proxy application corresponding to the guest application, wherein the proxy application is configured to receive the audio data stream creation event and relay the audio data stream creation event to the host operating system.

8. The method of claim 6, wherein the audio data stream creation event includes metadata that identifies parameters of the audio data stream, and wherein rendering the audio data stream based on the global audio policy includes applying the global audio policy to the parameters of the audio data stream.

9. The method of claim 6, further comprising:
   sending, to the guest application, metadata identifying the shared memory space allocated for the audio data stream.

10. The method of claim 1, wherein allocating, receiving, and rendering are performed by an audio stack of the host operating system.

11. The method of claim 1, wherein the global audio policy includes one or more of audio settings, user preferences, audio processing technologies, and/or audio hardware features that are applied to the audio data stream.

12. The method of claim 1, wherein the virtual machine includes a virtual machine operating system for a different computing platform than a computing platform of the host operating system.

13. The method of claim 1, wherein the audio data stream from the virtual machine and a different audio data stream from a host application outside of the virtual machine have a same rendering latency and/or a same number of hops to be rendered.

14. The method of claim 1, further comprising:
allocating a different shared memory space for shared access by both the virtual machine and the host operating system;
receiving, at the different shared memory space, a captured audio data stream captured from an audio recording system based on the global audio policy; and
providing the captured audio data stream, from the shared memory space, to the virtual machine.

15. A computing system, comprising:
one or more logic machines; and
one or more storage machines holding instructions executable by the one or more logic machines to:
instantiate, via a host operating system of the computing system, a virtual machine;
allocate a shared memory space of the one or more storage machines for shared access by both the virtual machine and the host operating system;
send, to the virtual machine, an audio hardware clock signal;
receive, at the shared memory space, an audio data stream from the virtual machine, wherein the virtual machine is configured to send the audio data stream to the shared memory space in synchronicity with the audio hardware clock signal; and
render, from the shared memory space, the audio data stream based on a global audio policy of the host operating system.

16. The computing system of claim 15, wherein the virtual machine is one of a plurality of virtual machines, wherein a different shared memory space is separately allocated for each virtual machine; and wherein audio data streams from all of the different shared memory spaces corresponding to the plurality of virtual machines are rendered based on the same global audio policy of the host operating system.

17. The computing system of claim 15, wherein the virtual machine includes a guest operating system and a guest application, and wherein the guest application provides the audio data stream to the shared memory space.

18. The computing system of claim 17, wherein the guest application is one of a plurality of guest applications, wherein a different shared memory space is separately allocated for each guest application; and wherein audio data streams from all of the different shared memory spaces corresponding to the plurality of guest applications are rendered based on the same global audio policy of the host operating system.

19. A computing system, comprising:
one or more logic machines; and
one or more storage machines holding instructions executable by the one or more logic machines to:
instantiate, via a host operating system of the computing system, a virtual machine including a guest application;
instantiate, via the host operating system, a proxy application corresponding to the guest application;
receive an audio data stream creation event relayed by the proxy application from the guest application in the virtual machine;
allocate a shared memory space for shared access by both the guest application and the host operating system;
send, to the virtual machine, an audio hardware clock signal;
receive, at the shared memory space, an audio data stream from the guest application, wherein the guest application is configured to send the audio data stream to the shared memory space in synchronicity with the audio hardware clock signal; and
render, from the shared memory space, the audio data stream based on a global audio policy of the host operating system.

* * * * *